United States Patent
Saito

[11] 3,824,665
[45] July 23, 1974

[54] APPARATUS FOR PRODUCING AN ASSEMBLY OF A METAL TUBING AND SERRATED ROD

[75] Inventor: Shigeru Saito, Yokohama, Japan

[73] Assignee: Nissan Motor Company, Limited, Yokohama, Japan

[22] Filed: Oct. 13, 1972

[21] Appl. No.: 297,335

[30] Foreign Application Priority Data
Oct. 14, 1971  Japan................................ 46-80557

[52] U.S. Cl.................... 29/200 B, 29/458, 29/520, 29/237, 72/344
[51] Int. Cl............................................ B23p 19/00
[58] Field of Search........... 29/200 B, 237 B, 458 B, 29/520 B; 72/344

[56] References Cited
UNITED STATES PATENTS

| | | | |
|---|---|---|---|
| 2,026,774 | 1/1936 | Davis et al. | 29/520 UX |
| 2,216,987 | 10/1940 | Rose | 29/520 UX |
| 2,333,120 | 11/1943 | Parker | 29/237 |
| 2,399,790 | 5/1946 | Conroy | 29/237 X |
| 2,488,566 | 11/1949 | Sperry | 29/520 UX |
| 2,509,006 | 5/1950 | Lynn | 29/520 UX |
| 2,852,843 | 9/1958 | Banta et al. | 29/520 X |
| 3,048,212 | 8/1962 | Morrison | 29/237 |
| 3,304,602 | 2/1967 | Osborne | 29/200 B UX |

*Primary Examiner*—Charlie T. Moon

[57] ABSTRACT

Herein disclosed are an improved method and apparatus for manufacturing an assembly of a hollow metal tubing and a rod having a serrated portion which is closely inserted into a reduced end portion of the tubing which has an inside diameter substantially larger than an outside diameter of the serrated portion of the rod. The rod is first loosely inserted through its serrated portion into the tubing and thereafter the reduced end portion of the tubing is radially squeezed by a swaging process so that the reduced end portion of the tubing is deformed under radial compression and closely fitted onto the serrated portion of the rod with an excess of wall of the reduced end flown into the grooves between the individual serrations of the rod. The assembly thus produced is specifically adapted to constitute a collapsible type steering column assembly which is used for the protection of a driver of a motor vehicle during a frontal collision.

8 Claims, 4 Drawing Figures

PATENTED JUL 23 1974 3,824,665
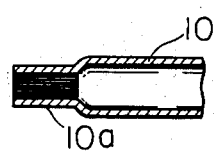
Fig. 1A
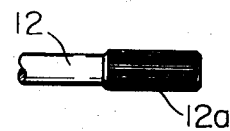
Fig. 1B
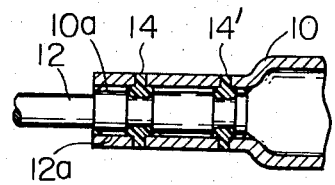
Fig. 2
Fig. 3
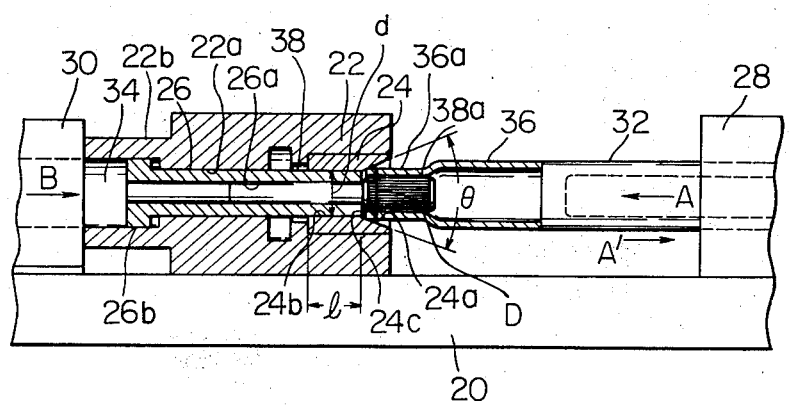

APPARATUS FOR PRODUCING AN ASSEMBLY OF A METAL TUBING AND SERRATED ROD

The present invention is concerned with a method of and an apparatus for closely fitting a hollow metal tubing onto a serrated metal rod which is inserted into the tubing.

An assembly of the hollow metal tubing and the serrated metal rod inserted thereinto is typically used for constituting an automotive steering column assembly of a collapsible construction. The collapsible steering column assembly has an internally serrated steering tube receiving therein an externally serrated steering main shaft connected to a steering wheel. The steering main shaft is closely fitted on the tubing through engagement between the serrations of the shaft and the tubing and is telescopically moved in and relative to the tubing when an unusually large amount of load is applied to the steering main shaft. The steering column assembly of this character is, therefore, adapted to absorb an impact exerted on a vehicle driver in the event of a frontal collision when the driver is forwardly flung and violently strikes on the steering wheel.

The tubing and rod constituting such an assembly is liable to become malaligned from each other in their axial and radial directions and, as a result, to produce unusual noises during operation of the assembly. Where the assembly is used for the automotive steering column assembly as above mentioned, an excess play is invited in manipulating the steering wheel and unpleasant noises are produced in consequence of the shocks and vibrations of the vehicle body during cruising of the motor vehicle.

In order to prevent the wear of the assembly of the tubing and rod as caused by the vibrations thereof, such wear leading to the malalignment between the tubing and rod, it has been required to have both of the tubing and rod cementation or induction hardened so as to provide increased surface stiffness and resistance to wear and abrasion.

Malalignment between the serrated tubing and rod may be precluded through provision of one or more inserts between them, as proposed in the limited quarters of the industry. This practice, however, necessitates a disproportionately great number of steps during production and thus results in an increased production cost of the final assembly.

Another expedient of preventing the play between the serrated tubing and rod is to use a plain (viz. unserrated) tubing in which the serrated rod is press fitted in an axial direction. In order that the serrated rod be fitted to the tubing so securely as to provide sufficient strength opposing a twisting torque applied thereto when the rod is turned about its axis relative to the tubing as in the case of the steering column assembly, it is important that the serrated rod be pressed into the tubing with an extremely great pressing effort with the result that the rod becomes unable to axially move in the tubing unless it is subjected to and extremely large amount of axial load. Where the assembly of this nature is used for the collapsible type steering column assembly, the rod undergoes a forceful reaction resulting from the excessively tight fit between the rod and tubing so that the steering column assembly will fail to collapse even through the driver of the motor vehicle is violently flung to the steering wheel. If the serrated rod is coated with grease or Teflon (a registered trade mark of E. I. du Pont de Nemours & Co., Inc., U.S.A.) or other lubricants before the rod is pressed into the tubing, then the friction between the serrated rod and tubing of the final assembly would be diminished so as to facilitate axial movement of the rod in the tubing when the rod is subjected to an unusual load. The fact is, however, that the lubricant over the peripheral surface of the serrated rod is removed therefrom when the rod is in the process of being pressed into the tubing by reason of an excess of inside diameter of the tubing to receive the rod therein.

It is, therefore, an object of the present invention to provide a method of and apparatus for producing an assembly of a hollow metal tubing and a serrated metal rod which is closely inserted into the tubing in a manner to prevent malalignment between the rod and tubing during use of the assembly.

It is another object of the present invention to provide a method of and an apparatus for producing an assembly of a hollow metal tubing and a serrated metal rod which is usually closely fitted on the tubing and which is axially moved in and relative to the tubing when subjected to an unusual load axially applied thereto.

It is still another object of the present invention to provide a method of and apparatus for producing an assembly of a hollow metal tubing and a serrated metal rod in a relatively small number of steps and at a relatively low production cost.

It is further and another object of the present invention to provide a method of and apparatus for producing an assembly of a hollow metal tubing and a serrated metal rod adapted to constitute a collapsible type steering column assembly of a motor vehicle for the protection of a vehicle driver from being hurt during a frontal collision of the motor vehicle.

The method to achieve these objects of the present invention basically comprises the steps of loosely inserting a serrated metal rod into a hollow metal tubing having an inside diameter appreciably larger than an outside diameter of the serrated rod, and squeezing the tubing onto the serrated rod for deforming the tubing under radial compression and causing the tubing to be closely fitted onto the serrated rod. More specifically, the method according to the present invention comprises the steps of loosely inserting metal rod having a serrated portion into a hollow metal tubing through the serrated portion of the rod, the metal tubing having a reduced portion which is substantially coextensive with the serrated portion of the rod and which has an inside diameter appreciably larger than an outside diameter of the serrated portion of the rod, forcing the reduced portion of the tubing into a die having an axial bore which at least partly has a diameter smaller than an outside diameter of the reduced portion of the tubing, and forcible withdrawing the resultant assembly of the rod and tubing out of the die.

The apparatus which is adapted to put this method into practice basically comprises a die having an axial bore which at least partly has a diameter appreciable smaller than the outside diameter of the reduced portion of the tubing, first driving means for forcing the tubing loosely receiving the serrated portion of the rod into the bore in the die, a guide member having an axial bore which is aligned with the bore in the die for guiding therethrough the rod and tubing which is being forced into the die, and second driving means for forcing the resultant assembly of the rod and tubing to withdraw from tthe die.

The first and second driving means comprise hydraulic cylinders having pistons which are moved to force the rod and tubing in opposite directions during the squeezing operation and withdrawal operation, respectively.

The features and advantages of the method and apparatus according to the present invention over the prior art techniques will become more apparent from the following description of the invention as taken in conjunction with the accompanying drawing, in which:

FIG. 1A is a longitudinal sectional view and FIG. 1B is a longitudinal plan view showing respectively a serrated metal tubing and a serrated metal rod to be connected together in a prior art method;

FIG. 2 is a longitudinal sectional view showing an assembly of a serrated metal tubing and a serrated metal rod which is inserted into and secured into position in the tubing in a prior art method; and FIG. 3 is a longitudinal sectional view showing, partly in side elevation, a preferred embodiment of the apparatus according to the present invention and an assembly of a hollow metal tubing and a serrated metal rod which is in the process of being combined together by the shown apparatus.

Reference is first had to FIGS. 1A and 1B. As illustrated, the hollow metal tubing 10 and metal rod 12 to be inserted into and fitted to the tubing in the prior art method have internally and externally serrated portions 10a and 12a, respectively, through which the tubing and rod fit together. Because both the tubing 10 and rod 12 are thus provided with the serrations and connected together through such serrations, the resultant assembly of them is liable to invite a play between the rod and tubing in consequence of malalignment therebetween as caused by shocks and vibrations transferred thereto during operation of the assembly such as in the collapsible steering column assembly of a motor vehicle, as previously discussed. To prevent such malalignment between the serrated portions 10a and 12a of the tubing 10 and rod 12, an assembly has been proposed which has spaced inserts 14 and 14' of plastics which are fused and set between the serrated portions 10a and 12a, as seen in FIG. 2. As previously noted, a disproportionately large number of steps and accordingly an increased cost are required for the production of the assembly of this construction and, thus, such assembly is not fully acceptable for practical purposes. These and other drawbacks inherent in the conventional methods are eliminated in the method according to the present invention through use of the squeezing operation in forcibly fitting the metal tubing onto the serrated metal rod as previously described. This squeezing operation is herein referred to as swaging which is a kind of cold forging process for working metal articles. The swaging used to closely fit the metal tubing to the serrated metal rod as herein proposed is advantageous because it permits of arbitarily selecting the mechanical strength with which the tubing is forced against the serrated rod and accordingly the limit at which the assembly of the rod and tubing starts to axially collapse. If desired, the grease, Teflon (R.T.M.) or any other lubricants may be applied to between the engaging portions of the rod and tubing so as to facilitate axial movement of the rod in and relative to the tubing when the rod is subjected to an unusually large amount of axial load.

An apparatus adapted to carry out the swaging operation for connecting the hollow metal shaft and serrated metal rod in the method according to the present invention is now illustrated in FIG. 3.

Referring to FIG. 3, the swaging apparatus according to the present invention includes a stationary platform 20 carrying thereon a bracket 22 having an axial bore 22a. The bracket 22 support at a leading end of its bore 22a a die 24 having an axial bore which is aligned with the bore 22a in the bracket 22. This die 24 is usually formed of or lined with hardened steel having sufficient rigidity. The axial bore in the die 24 has an outer portion 24a which merges from an inner portion 24b through a circumferential chamfer 24c. These outer and inner portions 24a and 24b of the bore 24 are herein assumed to have diameters of D and d, respectively, where apparently D>d while the circumferential chamfer 24c is enlarged axially outwardly of the bore at an angle of θ. The length of the inner reduced portion 24b of the bore in the die 24, on the other hand, is assumed to be l, as indicated in FIG. 3.

A generally tubular guide member 26 is axially slidable in the bore 22a in the bracket 22, having its forward end located in the enlarged portion 24a of the bore in the die 24 when the guide member 26 is in the position substantially fully retracted into the bore 22a. The guide member 26 has an axial bore 26a which is aligned with the bore in the die 24. A pair of hydraulic cylinders 28 and 30 are positioned on the plarform 20, one cylinder 28 being located at a spacing from the end of the die 24 and the other cylinder 30 located behind the bracket 22, as seen in FIG. 3. These hydraulic cylinders 28 and 30 have reciprocating pistons 32 and 34, respectively, which are aligned with the bores in the bracket 22, die 24 and guide member 26.

Prior to the swaging operation by the apparatus thus constructed, a hollow metal tubing 36 and a metal rod 38 having a serrated end portion 38a are prepared. The tubing 36 have a reduced end portion 36a into which the serrated end portion 38a of the rod 38 is preliminarily loosely inserted. The length of the reduced end portion 36a which is substantially coextensive with the serrated end portion 38a of the rod 38 is herein assumed to be substantially equal to the axial length l of the inner reduced portion 24b of the bore in the die 24. The reduced end portion 36a of the tubing 36 is, moreover, assumed to have an outside diameter which is substantially equal to the diameter D of the outer enlarged portion 24a of the bore in the die 24. To commence swaging of the tubing 36 to the serrated end portion 38a of the rod 38, the reduced end portion 36a of the tubing 36 is fitted into the outer enlarged portion 24a of the bore in the die 24 with the rod 38 axially received in the bore 26a as illustrated. The piston 34 of the hydraulic cylinder 30 behind the bracket 22 is initially held in the position withdrawn from the aligned guide member 26.

In operation, the hydraulic cylinder 28 is actuated so as to cause the piston 32 projects in the direction of arrow A and buts at its leading end against the free end of the tubing 36. As the piston 32 protruded toward the bracket 22, the reduced portion 36a is forced into the inner reduced portion 24b of the bore in the die 24 and is deformed under radial compression exerted from the surrounding portion of the die 24. The reduced portion 36a of the tubing 36 is in this manner squeezed to an outside diameter of d when the tubing 36 is axially moved a distance l and accordingly the reduced end portion 36a thereof is fully forced into the bore in the die 24. In this condition, the reduced end portion 36a of the tubing 36 is forced closely against the serrated end portion 38a of the rod 38 and an excess of its wall is flown into the individual grooves between the serrations of the portion 38a.

Upon completion of the swaging operation, the piston 32 of the hydraulic cylinder 28 is retracted away from the bracket 22, viz., in the direction of arrow A' and, in turn, the other hydraulic cylinder 30 is actuated. The piston 34 of the hydraulic cylinder 30 is thus caused to project in the direction of arrow B toward the guide member 26. The guide member 26 is accordingly pressed axially toward the other piston 32 in the retracted position so that the squeezed portion 36a of the tubing 36 is forced out of the bore 24a in the die 24 together with the rod 38 closely fitting on the tubing 36 through its serrated portion 38a.

The outside diameter D of the outer enlarged portion 24a of the bore in the die 24 and the diameter d of the inner reduced portion 24b of the bore in the die 24 may be selected in a suitable manner depending upon the initial and desired final outside diameters of the reduced end portion 36a of the tubing 36, the material of the tubing 36, and the side, material and number of the serrations on the portion 38a of the rod 38. The angle θ of the circumferential chamfer 24c of the bore in the die 24 may preferably range from about 30° to about 60°. It is, moreover, apparent that the pistons 32 and 34 of the hydraulic cylinders 28 and 30 may be arranged as to have strokes of a distance l. Or otherwise an annular allowance may be formed around the bore 22a in the bracket 22 behind the inner reduced portion 24b of the bore in the die 24. Where desired, the guide member 26 may have formed integrally therewith a flange 26b at its end to abut against the piston 34 thereby to limit the stroke of the guide member 26 toward the other piston 32 during the withdrawal step of the tubing 36 and rod 38. Also, the bracket 22 may have a tubular guide portion 22b projecting toward the hydraulic cylinder 30 so as to slidably receive therein the flange 26b of the guide member 26 and the piston 34, as illustrated.

It will now be appreciated from the foregoing description that the method and apparatus according to the present invention is adapted to produce an assembly of a tubing and a serrated rod which is closely received in the tubing in a manner to be maintained free from malalignment during use of the assembly and to be axially moved relative to the tubing when an unusual load is applied to the rod. Since the tubing to be combined with the serrated rod need not be worked by broaching, the operation for producing the assembly of the tubing and serrated rod is facilitated significantly, resulting in considerably reduction in the cost of manufacturing such assembly. If the serrated rod is preliminarily coated with a suitable lubricant such as grease or Teflon as previously noted, the axial movement of the serrated rod in the tubing will be streamlined without impairement of the resistance to the twisting torque when the rod is turned about its axis. The assembly of the tubing and serrated rod as produced in the method and by the use of the apparatus according to the present invention is thus especially adapted to constitute a collapsible type steering column assembly of a motor vehicle.

What is claimed is:

1. An apparatus for forming an assembly of a hollow metal tubing and a metal rod having a serrated portion into said tubing which has a reduced end portion having an inside diameter appreciable larger than an outside diameter of said serrated portion of the rod, comprising a stationary die having an axial bore which at least partly has a diameter appreciably smaller than the outside diameter of said reduced end portion of said tubing, first driving means for forcing said tubing into said bore in said die, said tubing preliminarily relatively loosely receiving said serrated portion of the rod through said reduced end portion, a guide member having an axial bore which is substantially aligned with said bore in said die for guiding said rod and tubing when the tubing is being forced into said bore in the die, and second driving means for forcing the resultant assembly of the die and tubing out of said bore in the die.

2. An apparatus as claimed in claim 1, in which said bore in said die has an outer enlarged portion having a diameter substantially equal to said outside diameter of said reduced end portion of said tubing.

3. An apparatus as claimed in claim 2, in which said outer enlarged portion of said bore in said die merges into an inner reduced portion through a circumferential chamfer.

4. An apparatus as claimed in claim 3, in which said chamfer has an angle ranging between about 30° and about 60°.

5. An apparatus as claimed in claim 3, in which said inner reduced portion of said bore in the die has a length substantially equal to a length of said reduced end portion of the tubing.

6. An apparatus as claimed in claim 1, further comprising a stationary bracket having an axial bore in which said guide member is axially slidable.

7. An apparatus as claimed in claim 1, in which said first and second driving means respectively comprise hydraulic cylinders having respective pistons which are operable to be moved for forcing said rod and tubing in opposite directions through said die during the squeezing and withdrawal operations.

8. An apparatus as claimed in claim 7, in which said pistons are aligned with said bore in said die and with said guide member.

* * * * *